United States Patent
Kazmi et al.

(10) Patent No.: US 8,818,352 B2
(45) Date of Patent: Aug. 26, 2014

(54) METHOD AND ARRANGEMENT IN A TELECOMMUNICATION SYSTEM

(75) Inventors: Muhammad Kazmi, Bromma (SE); Aurelian Bria, Nacka (SE); Farshi Ghasemzadeh, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 279 days.

(21) Appl. No.: 13/120,471

(22) PCT Filed: Jun. 30, 2009

(86) PCT No.: PCT/SE2009/050835
§ 371 (c)(1),
(2), (4) Date: Mar. 23, 2011

(87) PCT Pub. No.: WO2010/036180
PCT Pub. Date: Apr. 1, 2010

(65) Prior Publication Data
US 2011/0177806 A1   Jul. 21, 2011

Related U.S. Application Data

(60) Provisional application No. 61/099,618, filed on Sep. 24, 2008.

(51) Int. Cl.
*H04W 4/00* (2009.01)
*H04W 52/36* (2009.01)
*H04W 84/04* (2009.01)
*H04W 84/10* (2009.01)

(52) U.S. Cl.
CPC .......... *H04W 52/367* (2013.01); *H04W 84/045* (2013.01); *H04W 84/105* (2013.01)
USPC ...................................................... 455/422.1

(58) Field of Classification Search
USPC ........... 455/422.1, 423–425, 426.1, 427, 448, 455/522
See application file for complete search history.

(56) References Cited

U.S. PATENT DOCUMENTS

| | | | |
|---|---|---|---|
| 2006/0135070 A1* | 6/2006 | Karabinis | 455/63.1 |
| 2007/0097939 A1* | 5/2007 | Nylander et al. | 370/338 |
| 2008/0188265 A1 | 8/2008 | Carter et al. | |
| 2009/0042595 A1* | 2/2009 | Yavuz et al. | 455/522 |
| 2009/0325592 A1* | 12/2009 | Jang et al. | 455/456.1 |

\* cited by examiner

*Primary Examiner* — Brandon Miller
(74) *Attorney, Agent, or Firm* — Coats & Bennett, PLLC

(57) ABSTRACT

A method for dynamically adapting the maximum output power of a femto base station is provided. The method is based on determining the number of satellites currently detected and/or the reception quality of the satellite(s), and dynamically adapting the maximum output power from the femto base station in response to the determined number of satellites and/or the reception quality of the satellite(s). Hereby, an accurate position of the femto base station can be obtained for providing input used for determining the maximum output.

22 Claims, 5 Drawing Sheets

METHOD AND ARRANGEMENT IN A TELECOMMUNICATION SYSTEM

FIELD OF THE INVENTION

The present invention relates to a method and arrangement in a telecommunication system, in particular to a method and arrangement for setting the maximum output power for a femto base station.

BACKGROUND

The standardization of femto base station or the so-called home base station is an ongoing process in 3GPP. The femto base stations are to be deployed in home, in office or in other private premises and is a radio base station adapted to cover a small area such as a home or similar place. An operator may choose to share the same carrier between femto base stations and macro/micro/pico base stations (i.e. non femto base stations) or alternatively assign a dedicated carrier only for femto base stations. Particularly, in the former scenario unnecessary high transmission power level of the femto base stations may severely impact the macro base station. Therefore the transmit power of the femto base station needs to be properly regulated.

The terms femto base station, home base station, home Node B, home 3G Access point or home eNode B refer to the same type of base station in principle. For simplicity the term femto base station will be used hereinafter.

In FIG. 1 is shown a block diagram illustrating a Wideband Code Division Multiple Access (WCDMA) network including femto base stations. The wireless communications network 1 includes a core network (CN) 2 connected to a radio network controller, (RNC) 3, using a standard Iu interface. Alternatively, the RNC is a Macro RNC and/or a Femto RNC. The RNC controls all Radio Base Stations that are connected to the RNC, both Macro and Femto Radio Base Stations. In the figure, the RNC 3 is connected to a Macro Radio Base Station (RBS) 4 and to one or more femto base stations 6 belonging to a group of femto base stations 5. The interface between the femto base stations and the RNC is a Iub+ interface or an Extended Iub interface, and is transported using an Internet Protocol (IP) network providing IP connectivity between a femto base station and the RNC. As this IP network may consist of unprotected IP networks, security mechanisms between the RNC and the femto base stations are included. Communication between the RNC 3 and the Macro RBS 4 is IP based or IP/Asynchronous Transfer Mode (ATM) based, and the interface is Iub. The Macro RBS 4 is working as an access point for one or more mobiles 9 within a macro cell 7. The group of femto base stations 5 are working as access points for mobiles within femto cells 8. The RNC 3 may also communicate with a femto base station 6 via the Macro RBS 4. This way the femto base station uses the Macro RBS as a wireless access point into the core network. An Operation Support Systems (OSS) 12 usually performs management of access points, Macro RBSs. A femto base station manager 13 is responsible for managing the femto base stations. The OSS and the femto base station manager can be stand alone nodes or parts of other nodes like the RNC 3 or the CN 2. The OSS and the femto base station manager can also be distributed programs in a network 1.

The following sections describe various concepts and technological aspects, which are used or are related to the present description.

Femto Base Station

In legacy UTRAN specifications three classes of base stations are defined, see third generation partnership project (3GPP) Technical specification (TS) No. 25.104, "Base Station (BS) radio transmission and reception (FDD)":
Wide area BS; it serves macro cell deployment.
Medium range BS; it serves micro cell deployment.
Local area BS; it serves pico cell deployment.
Femto base stations are being developed to serve even smaller and more localized areas than the pico cells. Femto base stations operate under licensed frequency band and are currently under standardization within 3GPP.

In WCDMA, the femto base station maximum output power is proposed to be limited to 20 dBm for non Multiple Input Multiple Output (MIMO) case or 17 dBm per antenna port in case of MIMO (2×2).

In general these different base station classes differ due to different minimum coupling loss in different environments. Secondly they typically operate at different maximum output power levels. For instance wide area base stations operate at higher maximum output power than the medium range and so on. These factors in turn lead to different performance requirements for different base station classes. These requirements are defined in 3GPP TS 25.104, "Base Station (BS) radio transmission and reception (FDD)".

One main difference compared to other base station classes is that the Femto base station is owned by a private subscriber, who is at the liberty to install at any location. Thus, strict network planning is not possible in case of femto base station network. This is in contrast with other base station classes, which are deployed by an operator according to some well defined principles. The lack of precise network planning of femto base stations may cause interference to other base stations.

Femto Base Station Implementation Aspects

A femto base station comprises of normal base station functions such as transmitting and receiving signals to and from multiple User Equipment (UE). In addition it can comprise a normal UE receiver circuitry for performing measurements, which in turn can be used for adjusting its output power level. This UE receiver circuitry is compliant to the UE performance requirements specified in the relevant UE specification.

Femto Base Station Deployment Scenarios

Mixed Carrier Scenario

In this scenario the femto base station operates on the same frequency channel as that of the surrounding macro network belonging to the operator which deploys the femto base station. An operator with a limited spectrum may be obliged to have a mixed carrier deployment scenarios if it wishes to offer femto base station coverage. The mixed carrier scenario is obviously more challenging in terms of co-channel interference between femto base stations and between femto base stations and the macro network.

Dedicated Carrier Scenario

In this scenario the femto base station operates on a different frequency channel compared to that of the surrounding macro network belonging to the operator which deploys the femto base station. This scenario is less severe in terms of interference between the femto network and the macro network. However, there would still be an impact of adjacent channel interference due to out of band emissions.

Measurements for Adaptive Power Control

As stated above a femto base station can have an inbuilt UE receiver for performing measurements. This means that a femto base station can perform same measurements which are done by the actual UE. These measurements are used by the femto base station to perform adaptive power control, i.e. setting of maximum output power.

In WCDMA the following three downlink radio measurements are specified primarily for the mobility purpose, see 3GPP TS 25.215, "Physical layer measurements (FDD)":

CPICH RSCP
CPICH Ec/No; CPICH Ec/No=CPICH RSCP/carrier RSSI
UTRA Carrier RSSI

The RSCP is measured by the UE on cell level basis on the common pilot channel (CPICH). The UTRA carrier RSSI (the total received power and noise from all cells, including serving cells) is measured over the entire carrier. The above CPICH measurements are the main quantities used for the mobility decisions.

In E-UTRAN the following downlink radio measurements are specified also primarily for mobility purpose, see 3GPP TS 36.214, "Evolved Universal Terrestrial Radio Access (E UTRA); Physical layer measurements":

Reference symbol received power (RSRP)
Reference symbol received quality (RSRQ): RSRQ=RSRP/carrier RSSI The RSRP or RSRP part in RSRQ in E-UTRAN is solely measured by the UE on cell level basis on reference symbols. There is no specific carrier RSSI measurement rather it is part of RSRQ definition. The neighbour cell measurements are typically averaged over long time period in the order of 200 ms or even longer to filter out the effect of fast fading.

There is also a requirement on the UE to measure and report the neighbour cell measurements (e.g. RSRP and RSRQ in E-UTRAN) from certain minimum number of cells. In both WCDMA, see 3GPP TS 25.133, "Requirements for support of radio resource management (FDD)", and E-UTRAN, see 3GPP TS 36.133, "Evolved Universal Terrestrial Radio Access (E UTRA); Requirements for support of radio resource management, this number is 8 cells (comprising of one serving and seven neighbour cells) on the serving carrier frequency (or commonly termed as intra-frequency).

Adaptive Power Control

Unlike other base station classes, femto base stations are owned by the subscriber and will be deployed in homes, flats and other private premises. This means their physical location is not under the control of an operator. As they operate under licensed band, they may cause interference to each other but as well as to the outdoor base stations specifically the macro networks. The interference will be worse in case femto and outdoor base stations operate on the same carrier frequency. Due to this potential risk of interference, the maximum output power of the femto base station should be regulated to minimize the impact on other cell applications e.g. macro. Typically the maximum output power will be varied slowly i.e. in the order of several seconds or even longer.

Depending upon the access technology of the femto base station, one or more radio measurements specific to that access technology will typically be used by the femto base station to adjust its transmit power level. This means in WCDMA the measurements that can be used are: CPICH RSCP, CPICH Ec/No and UTRA carrier RSSI. The cell specific measurements (i.e. RSCP or Ec/No in WCDMA) are indeed done on neighboring base stations, which may be femto base stations, macro/micro/pico (i.e. non femto base station) or combination thereof. In any case according to the current WCDMA requirements only up to 8 cells can be measured on the intra-frequency carrier or 6 cells on inter-frequency carriers. These measurements need to be combined and processed in an adequate manner to make sure that the adjusted power leads to reduction in interference to the non femto base stations. At the same time whenever possible, that is when relatively shielded from the non femto base stations, the femto base station is able to operate at relatively higher output power so that femto base station resources are fully exploited.

Satellite Based Positioning Methods

The popularity of a service allowing the determination of user positioning via a dedicated handheld device or an integrated mobile phone is on the rise. Furthermore, for different reasons, mobile positioning is gradually becoming mandatory in several parts of the world. For instance, in the US the FCC mandate for Phase II E-911 services (emergency call public safety systems) in the near future will require that all mobile devices support positioning. Thus, in upcoming years most mobile devices are likely to support some sort of positioning mechanism.

Several methods are in fact already standardized and could be used for positioning (i.e. for determining mobile user position) in mobile communication. Some well known examples are: satellite based positioning, fingerprinting, time of arrival based method, etc. Global Navigation Satellite System (GNSS) is the standard generic term for satellite navigation systems that enable subscriber to locate their position and acquire other relevant navigational information.

The global positioning system (GPS) and the European Galileo positioning system are well known examples of GNSS. Other potential systems, which are either proposed or being developed are: Russian GlObal Navigation Satellite System (GLONASS), Chinese COMPASS and Indian Regional Navigational Satellite System (IRNSS).

However, only GPS is currently in operation for more than a decade. The GPS comprises of a constellation of 24 to 32 medium earth orbit (MEO) satellites revolving around the earth. They transmit pilot signals and other broadcast information, which are received and processed by the GPS receivers for determining geographical position. Signals from certain number of satellites (e.g. 5 or more) should be received in order for the GPS receiver to accurately location the geographical position of the user. Of course more number of visible satellites would further enhance the accuracy.

The assisted GPS (A-GPS) is tailored to work with a user terminal (UE) and thus enables UE subscribers to relatively accurately determine their location, time, and even velocity (including direction) in open area environment provided sufficient number of satellites are visible.

On the other hand the positioning methods based on fingerprinting enable the location of mobile users with good accuracy in closed or indoor locations such as inside buildings, parking lots, hospitals, etc. Among various positioning methods, A-GPS is considered to be one of the most viable and commonly used one.

As described earlier the femto base station can incorporate an inbuilt UE receiver. This means it can also implement A-GPS receiver or support other possible positioning method. Nevertheless in a legacy network (i.e. comprising of non femto base stations) supporting GPS service, the base stations also have a GPS receiver. This is used to provide some basic GPS related information (e.g. satellites, base station GPS coordinates etc) to the UE. This information assists UE in determining GPS position relatively quickly especially after a cold start e.g. initial access or coming out of a tunnel. This means a femto base station is also likely to have an inbuilt A-GPS receiver.

Several solutions have been proposed to adaptively adjust the femto cell output power so as to minimize the co-channel or neighbor cell interference. However the current solutions don't fully ensure the protection of non femto base stations especially the macro base stations.

Existing systems typically use one or more measurements and adapt the maximum output power. However, all measurements don't have the same accuracy levels. For instance carrier RSSI has very coarse accuracy compared to that of CPICH Ec/No in WCDMA, see 3GPP TS 25.133, "Requirements for support of radio resource management (FDD)". In some solution only CPICH Ec/No is used for adapting the output power. Although Ec/No has better accuracy but it does not fully incorporate and depict the overall interference on a carrier. Secondly these existing solutions don't enable femto base station adaptive power unit to identify uniquely the proximity of a macro network. Thus these solutions on the one hand are unable to fully protect the macro network as femto base stations may be operating at higher output power than desired. On the other hand the maximum output power may be conservatively set causing performance loss of the femto base stations.

Hence, there exists a need for an improved method of determining the maximum output power from a femto base station.

SUMMARY

It is a first object of the present invention to achieve a method and arrangement that allows a femto base station to operate on an optimal output power which protects the macro network from interference but without causing performance loss due to limitations to too conservatively set maximum output power levels.

This object and other is obtained by the method and femto base station as set out in the appended claims. Thus, a method for dynamically adapting the maximum output power of a femto base station is provided. The method is based on determining the number of satellites currently detected and/or the reception quality of the satellite(s), and dynamically adapting the maximum output power from the femto base station in response to the determined number of satellites and/or the reception quality of the satellite(s). Hereby, an accurate position of the femto base station can be obtained for providing input used for determining the maximum output.

In accordance with one embodiment satellite signals are detected using a Global Navigation Satellite System, GNSS, receiver, in particular a Global Positioning System, GPS, receiver.

In accordance with one embodiment an aggregate value of all the detected satellites is used to dynamically adapting the maximum output power.

In accordance with one embodiment the maximum power is set as one of two or more levels of maximum output power. The level can be set in response to predefined satellite reception quality levels and/or number of detected satellites.

In accordance with one embodiment the femto base station uses A-GPS reception quality to determine whether there are strong non femto base stations (e.g. outdoor base station) or not. The femto base station then adjusts its maximum output power depending upon whether there are strong outdoor base stations or not.

In accordance with one embodiment the maximum output power of the femto cell is adjusted based on the aggregated weighted of measurements, e.g. weighted sum of all or subset of UE measurements. These measurements can be performed by the measurement unit in a femto base station. The measurement unit may either be an inbuilt UE receiver in a femto base station or comprise of any receiver component, which is capable of performing one or more of the above mentioned measurements.

In accordance with one embodiment the femto base station first measures the path loss of non femto base stations (e.g. in outdoor environment) by acquiring system information. Depending upon the path loss between itself and the non femto base station(s) the maximum output power is adjusted adaptively.

Yet in another embodiment two or more of the above methods can be combined to more accurately set the maximum output power.

The invention also extends to a femto base station adapted to operate in accordance with the above.

Using the method and base station will significantly reduce interference to other cell layer applications e.g. macro network. Also, the inbuilt functions in femto base stations e.g. GPS receiver or UE measurements are exploited for adaptive maximum output power. Yet another advantage with the invention is that the femto base station is able to operate at its maximum power level whenever possible without significantly interfering with the surrounding network.

BRIEF DESCRIPTION OF THE DRAWINGS

The present invention will now be described in more detail by way of non-limiting examples and with reference to the accompanying drawings, in which.

DETAILED DESCRIPTION

Figure 1:
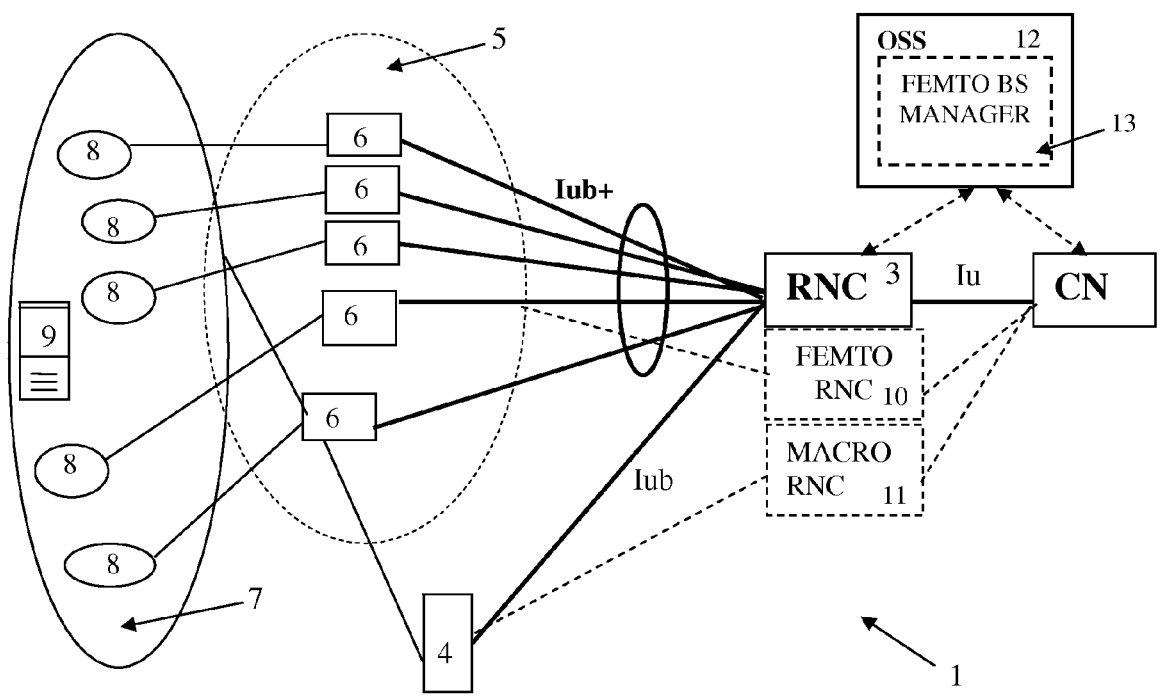
FIG. 1 shows a block diagram illustrating a WCDMA network including a number of femto base stations.
Figure 2:
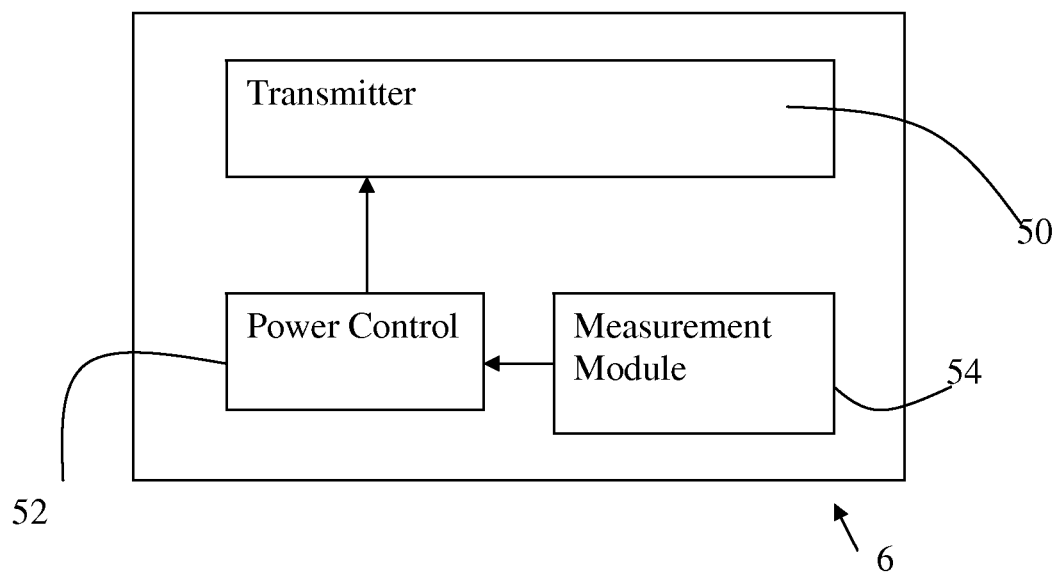
FIG. 2 is a view of a femto base station.

In FIG. 2 a general view of a femto base station 6 is shown. The femto base station 6 comprises a transmitter 50. The output power of the transmitter is controlled by a power controller 52, which receives input data from a measurement module 54 for controlling the output power. The measurement module can be adapted to generate data to various parameters including but not limited to GPS Detection Performance, inbuilt UE Measurements and Path Loss Measurements. By dynamically adapting the maximum output power of the femto base station the following is obtained:

I. Interference to other non-femto cell applications, especially the outdoor networks (e.g. macro base stations) remains within an acceptable limit.

II. The femto base station is able to operate at its maximum output power level while the first objective is not violated. This means the maximum possible potential of the femto base station is exploited.

Below some exemplary embodiments illustrating different methods to dynamically adapting the maximum output power of the femto base will be described, namely.

Maximum Output Power Adjustment based on GPS Detection Performance

Figure 3:
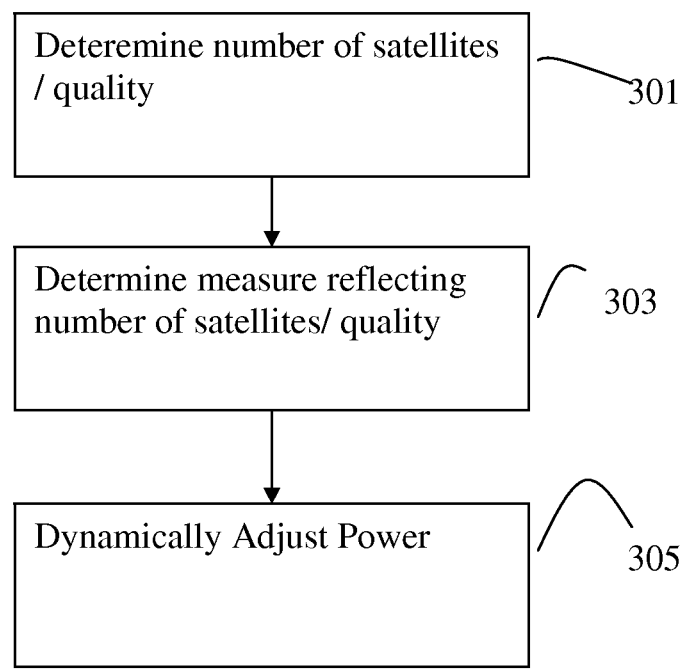
FIG. 3 is a flow chart illustrating some procedural steps performed when controlling the output power in a femto base station.

Maximum Output Power Adjustment based on Aggregated Weighted inbuilt UE Measurements Maximum Output Power Adjustment based on Path Loss Measurement Maximum Output Power Adjustment based on a Combined Scheme Maximum Output Power Adjustment Based on GPS Detection performance According to this embodiment the GPS receiver in the femto base station is used to set the maximum output power. Two aspects of the GPS receiver can be exploited. First is the number of detected satellites ($N_S$) and second is the reception quality ($Q_R$) of the signal of the detected satellites. In FIG. 3 a flowchart illustrating some procedural steps performed when dynamically adapting the maximum output power of the femto base station using GPS data is shown. First, in a step 301 the number of satellites currently detected and/or the reception quality of the satellite(s) is determined. Next, in a step 303, a measure reflecting the number and/or quality determined in step 301 is determined. Then, in a step 305, the output power of the femto base station is set in response to the measure derived in step 303. At least 4-5 satellites should be visible with sufficient quality to obtain good accuracy of the geographical location. Furthermore, the reception quality can be an aggregate value of all the detected satellites e.g. weighted average of all detected satellites or certain number of strongest satellites. All together ($N_S$ and/or $Q_R$) is referred to as GPS detection performance for simplicity. Then depending upon the GPS detection performance the femto base station maximum output power is set. The mapping function, which maps the GPS detection performance to the maximum output power of the femto base station ($P_{mas\_FBS}$) could use either $N_S$ or $Q_R$ or combination thereof as expressed in (1), (2) and (3):

$$F(\alpha_1 N_S) \rightarrow P_{max\_FBS} \quad (1)$$

$$F(\alpha_2 Q_R) \rightarrow P_{max\_FBS} \quad (2)$$

$$F(\alpha_1 N_S, \alpha_2 Q_R) \rightarrow P_{max\_FBS} \quad (3)$$

Where: $\alpha_1$ and $\alpha_2$ are the weighted factors. Any suitable mapping function such as weighted sum or average can be used.

The above mapping functions are used to create lookup tables to generate the maximum output power based on $N_S$ or $Q_R$ or combination thereof.

Poor GPS detection performance would correspond to the scenario whereby the femto base station is considerably shielded from outside base stations. For instance femto base station could be located in the basement and in that case would not significantly affect the outdoor base stations (e.g. macro or micro base stations). Therefore higher maximum output power could be used. On the other hand good GPS detection performance would mean that the location of the femto base station could potentially cause significant interference to the outdoor base stations unless the maximum output power is reduced to a certain level.

This method is described for GPS receiver since this is the only GNSS in operation as of today. However, the method is applicable to a femto base station, which has any GNSS receiver. For instance this can apply to future envisioned systems e.g. GLONASS, Galileo positioning system, COMPASS, IRNSS etc.

Two Maximum Power Levels

In one simpler approach there are only two levels of maximum output power: lower maximum ($P_{max\_FBS\_low}$) and higher maximum ($P_{max\_FBS\_high}$) output power levels. This means the mapping functions in (1), (2) and (3) will be used to generate lookup tables with two maximum power levels, which in turn are used for setting the maximum output power of the femto base station. The maximum level would typically correspond to the maximum nominal output power e.g. 20 dBm for the WCDMA femto base station.

If one or both of the above quantities ($N_S$ and/or $Q_R$) are above their predefined thresholds then lower maximum output power for femto base station is set. Otherwise higher maximum output power is set. This will ensure the protection of macro network.

In another embodiment, which is the opposite case, if one or both of the above quantities ($N_S$ and/or $Q_R$) are above their predefined thresholds then higher maximum output power for femto base station is set. Otherwise lower maximum output power is set. This will ensure that users are properly served by the femto base station.

Nevertheless in both the above embodiments, the basic concept is to regulate the maximum output power based on GPS (or GNSS) detection performance.

Multiple Maximum Power Levels

A further refinement or more complex approach is to have several levels (N) of maximum output power. Each level is mapped to the predefined GPS detection performance levels i.e. certain predefined GPS reception quality levels and/or number of detected GPS satellites. This means the mapping functions in (1), (2) and (3) will be used to generate lookup tables with N maximum power levels, which in turn are used for setting the maximum output power of the femto base station. Thus depending upon the GPS performance the femto base station maximum output power is set with finer granularity.

Maximum Output Power Adjustment Based on Path Loss Measurement

In this method if the total received interference (e.g. carrier RSSI) as measured by the femto base station is above a certain threshold then the measurement unit (e.g. in-built UE receiver) in the femto base station reads the system information of M strongest base station(s). Preferably these base stations are outdoor/macro base stations. The strongest base stations are determined by measuring cell specific measurements e.g. CPICH RSCP and/or CPICH Ec/No in WCDMA. From the system information all necessary information to translate the RSCP to the path loss is determined by the measurement unit in the femto base station. The measurement unit may either be an inbuilt UE receiver in a femto base station or comprise of any receiver component, which is capable of performing path loss measurement.

There is limited number of physical cell identities (PCI), which are assigned to different cells and therefore have to be reused in a coverage area. In WCDMA there exist 512 PCIs. In E-UTRAN there are 504 PCIs in total. As is previously known the PCIs can be partitioned into two groups. One larger group of PCIs is used for macro/micro/pico cells whereas the second relatively smaller group is exclusively reserved for femto base stations. This information i.e. the partitioned groups of PCIs can be signaled in a broadcast channel. The objective of this procedure is that the UE which is barred from camping onto femto base stations would use this signaled information to avoid reselecting to a femto base station. This solution will be used in E-UTRAN and may also be employed in later UTRAN releases.

In summary the measurement unit in a femto base station, based on the partitioned PCIs is likely to identify whether the cells belong to a macro or a femto network. The measurement unit may either be an inbuilt UE receiver in a femto base station or comprise of any receiver component, which is capable of performing path loss measurement.

Regardless how the femto base station (the measurement unit such as an inbuilt UE receiver) determines whether a particular cell is of femto or macro network, the key point is that the measurement unit in the femto base station can identify this difference. In this way the femto base station will read the broadcast channel of only the N strongest macro cells (i.e. non femto cells) and download the necessary system information needed to determine the path loss.

If the path loss of the N (where N≥1) strongest base stations (preferably non femto base stations) is above certain threshold then femto base station maximum output power is adaptively adjusted to certain level. This is because the femto base station is in closer vicinity of the macro base station(s) and so the maximum power could be increased to maintain femto coverage while at longer distance (i.e. when path loss is large) towards the macro base-stations the femto BS power should be decreased to decrease the interference towards the users in the macro network. This approach ensures UE are able to be properly served by the femto base station.

Figure 4:
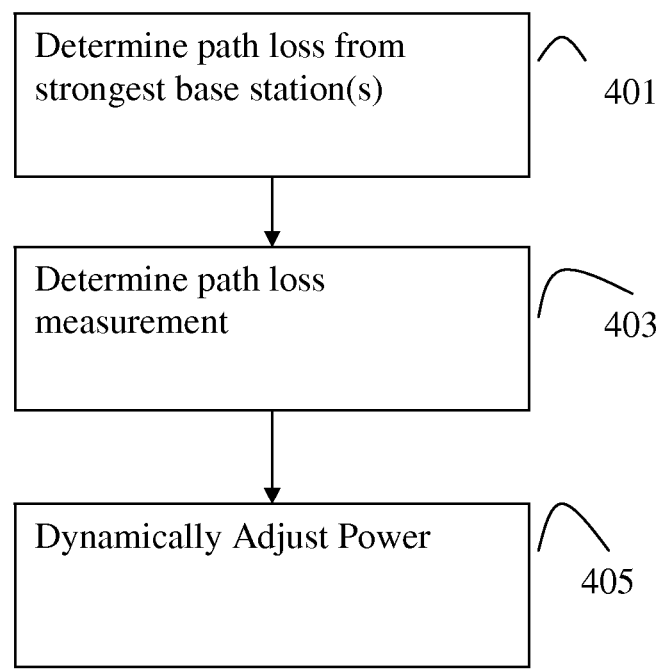
FIG. 4 is a flow chart illustrating some procedural steps performed when controlling the output power in a femto base station.

In FIG. 4 a flowchart illustrating some procedural steps performed when dynamically adapting the maximum output power of the femto base station using path loss is shown. First, in a step 401 the path loss of at least a strongest neighboring base station is determined. Next, in a step 403, a measure reflecting one or many path losses determined in step 401 is determined. Then, in a step 405, the output power of the femto base station is set in response to the measure derived in step 403.

Yet in another embodiment the maximum output power can be adjusted in opposite manner i.e. set lower maximum output power when path loss between macro and femto base stations is small or vice versa. This second embodiment ensures the protection of macro network.

Instead of 2 maximum power levels, multiple power levels could also be considered. In that case different predefined path loss thresholds are needed to map the average path loss (e.g. of N strongest cells) to the maximum output power levels.

As an example if 2 maximum power levels are used the algorithm could be expressed as:

IF (F{β·$\overline{PL_N}$} ≤ $PL_{threshold}$ )
    P max_FBS = P max_FBS_high
ELSE
    P max_FBS = P max_FBS_low Where: β is the weighted factor used in the above function and $\overline{PL_N}$ is an average path loss of the N strongest cells, which could also be only macro cells. In case N=1; only the strongest cell or the strongest macro cell is to be considered.

It is to be noted that the basic idea of determining path loss from signal strength measurement (e.g. CPICH RSCP) and the certain network signaled system parameters (e.g. pilot transmitted power) is well known. In this embodiment this mechanism is used for the estimation of the path loss between the femto and macro base stations, wherein the path loss is used to determine whether a femto base station is close or far from the macro base station and depending upon the path loss relation adjusting the maximum output power of the femto base station.

Maximum Output Power Adjustment Based on Aggregated Weighted Measurements

In this embodiment an aggregate of all radio measurements to determine the femto base station maximum output power is used. A weighted factor can also be used in the aggregated function to increase or decrease the contribution of a particular measurement. In WCDMA femto base station, this would mean the combination of CPICH RSCP, CPICH Ec/No and carrier RSSI are used for adjusting the maximum output power. In E-UTRAN the corresponding measurements are RSRP and RSRQ. These measurements are performed by the measurement unit in a femto base station. The measurement unit may either be an inbuilt UE receiver in a femto base station or comprise of any receiver component, which is capable of performing one or more of the above mentioned measurements.

Figure 5:
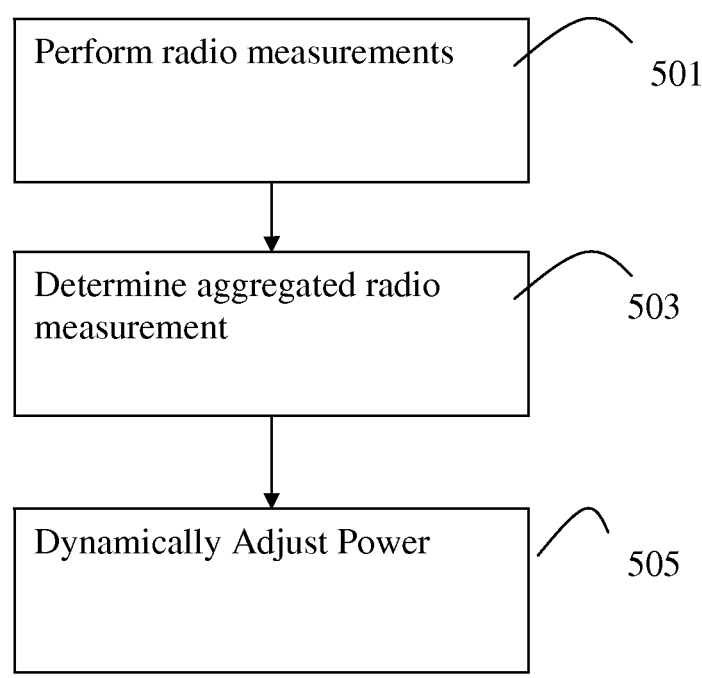
FIG. 5 is a flow chart illustrating some procedural steps performed when controlling the output power in a femto base station.

In FIG. 5 a flowchart illustrating some procedural steps performed when dynamically adapting the maximum output power of the femto base station using aggregated radio measurements is shown. First, in a step 501a number, at least two, radio measurements is determined. Next, in a step 503, a measure reflecting the aggregate of the at least two radio measurements from step 501 is determined. Then, in a step 505, the output power of the femto base station is set in response to the measure derived in step 503.

Furthermore, these measurements can be performed over longer time e.g. several seconds by making use of higher layer filter, which is generally termed as layer 3 filtering.

In one implementation, the averaged samples of each measurement quantities are weighted with some predefined number and the aggregate sum is then mapped to the maximum output power level.

Since different quantities have different levels of accuracy e.g. CPICH Ec/No is most accurate and carrier RSSI is least accurate. Therefore more weight can be given to CPICH Ec/No compared to RSSI. However, the inclusion of RSSI is useful as it incorporates the overall interference on the entire serving carrier frequency.

Depending upon the mapping function, which maps the weighted sum of the measurements to the maximum output power, either 2 or multiple output power levels can be used.

The mapping function, which maps the aggregated measurements (e.g. weighted sum of measurements) to the maximum output power of the femto base station ($P_{max\_FBS}$) is expressed in (4)-(7).

The parameters: $\gamma_1$, $\gamma_2$ and $\gamma_3$ are the weighted factors used in these functions.

The mapping functions in (4)-(5) and (6)-(7) are for UTRAN and E-UTRAN femto base stations respectively. Furthermore the mapping functions in (4) and (6) are general expression which means any suitable mathematical operation can be used for creating the mapping tables to determine the maximum output power of the femto base station. The functions in (5) and (6) are specific examples in which only weighted sum is used.

$$F\left\{\gamma_1 \overline{RSCP}, \gamma_2\left(\overline{\frac{E_c}{N_0}}\right), \gamma_3 \overline{RSSI}\right\} \to P_{max\_FBS} \quad (4)$$

$$\left[\gamma_1 \overline{RSCP} + \gamma_2\left(\overline{\frac{E_c}{N_0}}\right) + \gamma_3 \overline{RSSI}\right] \to P_{max\_FBS} \quad (5)$$

$$F\{\gamma_1 \overline{RSRP}, \gamma_2 \overline{RSRQ}\} \to P_{max\_FBS} \quad (6)$$

-continued $$[\gamma_1 \overline{RSRP} + \gamma_2 \overline{RS'RQ}] \rightarrow P_{max\_FBS} \quad (7)$$

As in previous schemes there are 2 opposite cases as to whether maximum output power should be set to higher or lower value depending upon aggregated measurements. Hence in one embodiment when the results of the aggregated measurements is above a threshold (e.g. femto base station is close to macro or other base stations) the maximum power can be increased to maintain good femto coverage while at longer distance (i.e. result of the aggregated measurements is lower) towards the macro base-stations the femto base station power should be decreased to lower the interference towards the users in the macro network. This approach ensures that the UEs are properly served by the femto base station. In the second embodiment the maximum output power can be adjusted in opposite manner i.e. lower maximum output power is set when the result of the aggregated measurements is higher than the threshold and vice versa. This second embodiment ensures the protection of the macro network.

Maximum Output Power Adjustment Based on a Combined Scheme

In this scheme two or more of the—Maximum Output Power Adjustment based on GPS Detection Performance; Maximum Output Power Adjustment based on Aggregated Weighted inbuilt UE Measurements; and Maximum Output Power Adjustment based on Path Loss Measurement as described above can be combined to set the maximum output power of the femto base stations.

For instance GPS detection performance can be used to determine whether the femto base station is closer to the macro base station(s) or not. Then either path loss based method or the aggregated weighted inbuilt UE measurements based method or combination thereof can be used to more accurately determine the maximum output power of the femto base station.

The present invention may, of course, be carried out in other ways than those specifically set forth herein without departing from essential characteristics of the invention. The embodiments described herein are to be considered in all respects as illustrative and not restrictive.

The invention claimed is:

1. A method of dynamically adapting a maximum output power of a femto base station, comprising:
    determining a satellite detection performance measure, wherein the satellite detection performance measure is a measure of the performance with which the femto base station detects satellites and comprises a number of satellites currently detected by the femto base station, a reception quality of one or more satellite signals associated with those satellites, or a weighted combination thereof; and
    dynamically adapting the maximum output power of the femto base station in response to and in direct dependence on the satellite detection performance measure.

2. The method according to claim 1, wherein said one or more satellite signals are detected using a Global Navigation Satellite System, GNSS, receiver.

3. The method according to claim 2, wherein said one or more satellite signals are detected using a Global Positioning System, GPS, receiver.

4. The method according to claim 1, wherein the satellite detection performance measure comprises said weighted combination.

5. The method according to claim 1, wherein said adapting comprises setting the maximum output power as one of two or more levels of maximum output power.

6. The method according to claim 5, wherein said adapting comprises setting the maximum output power to one of said levels directly as a function of whether the number of satellites currently detected by the femto base station is above or below a predefined number and/or whether said reception quality is above or below a predefined quality.

7. The method according to claim 1, wherein the maximum output power of the femto base station is derived from a mapping function or a lookup table which maps at least one of different numbers of detected satellites and different reception qualities of the one or more satellite signals to different maximum output powers.

8. The method according to claim 1, further comprising:
    determining the path loss of at least a strongest neighboring base station,
    determining a measure reflecting one or many path losses, and
    wherein the maximum output power from the femto base station is adapted in response to the measure reflecting one or many path losses in combination with the satellite detection performance measure.

9. The method according to claim 8, wherein determining the path loss of at least one strongest neighboring base station comprises:
    measuring a signal strength of a neighboring base station
    acquiring system information from a neighboring base station
    determining the path loss based on the measured signal strength and acquired system information.

10. The method according to claim 1, further comprising:
    determining at least two radio measurements,
    determining a measure reflecting the aggregate of the at least two radio measurements, and
    wherein the maximum output power from the femto base station is adapted in response to the measure reflecting one or many path losses in combination with the satellite detection performance measure.

11. The method according to claim 10, wherein the maximum output power of a femto base station is derived from a mapping function or a lookup table which maps different measures to different maximum output powers.

12. The method according to claim 1, wherein said adapting comprises setting the maximum output power to a relatively lower power directly responsive to determining that said measure exceeds a threshold defining said performance as relatively good and setting the maximum output power to a relatively higher power directly responsive to determining that said measure is below a threshold defining said performance as relatively poor.

13. The method according to claim 1, wherein said adapting comprises setting the maximum output power to a relatively higher power directly responsive to determining that said measure exceeds a threshold defining said performance as relatively good and setting the maximum output power to a relatively lower power directly responsive to determining that said measure is below a threshold defining said performance as relatively poor.

14. A femto base station configured to dynamically adapt the maximum output power thereof, comprising:
    a measurement circuit configured to determine a satellite detection performance measure, wherein the satellite detection performance measure is a measure of the performance with which the femto base station detects satellites and comprises a number of satellites currently detected by the femto base station, a reception quality of one or more satellite signals associated with those satellites, or a weighted combination thereof; and a power controller circuit configured to dynamically adapt the maximum output power of the femto base station in response to and in direct dependence on the satellite detection performance measure.

15. The femto base station according to claim 14, further comprising a Global Navigation Satellite System, GNSS, receiver configured to detect said satellites.

16. The femto base station according to claim 15, wherein the GNSS receiver comprises a Global Positioning System, GPS, receiver.

17. The femto base station according to claim 14, wherein the satellite detection performance measure comprises said weighted combination.

18. The femto base station according to claim 14, wherein the power controller circuit is configured to set the maximum power as one of two or more levels of maximum output power.

19. The femto base station according to claim 18, wherein the power controller circuit is configured to set the maximum output power by selecting from among said levels directly as a function of whether the number of satellites currently detected by the femto base station is above or below a predefined number and/or whether said reception quality is above or below a predefined quality.

20. The femto base station according to claim 14, wherein the power controller circuit is configured to derive the maximum output power of the femto base station from a mapping function or a lookup table which maps at least one of different numbers of detected satellites and different reception qualities of the one or more satellite signals to different maximum output powers.

21. The femto base station according to claim 14, wherein the power controller circuit is configured to dynamically adapt the maximum output power of the femto base station also in dependence on at least one of:

at least two radio measurements; and a path loss of at least a strongest neighboring base station.

22. A method of dynamically adapting a maximum output power of a femto base station, comprising: determining a satellite detection performance measure, wherein the satellite detection performance measure is a measure of the performance with which the femto base station detects satellites and comprises a number of satellites currently detected by the femto base station, a reception quality of one or more satellite signals associated with those satellites, or a weighted combination thereof; and dynamically adapting the maximum output power of the femto base station in direct dependence on the satellite detection performance measure, wherein said adapting comprises setting the maximum output power to a relatively lower power directly responsive to determining that said measure exceeds a threshold defining said performance as relatively good and setting the maximum output power to a relatively higher power directly responsive to determining that said measure is below a threshold defining said performance as relatively poor.

\* \* \* \* \*

UNITED STATES PATENT AND TRADEMARK OFFICE
CERTIFICATE OF CORRECTION

PATENT NO. : 8,818,352 B2
APPLICATION NO. : 13/120471
DATED : August 26, 2014
INVENTOR(S) : Kazmi et al.

It is certified that error appears in the above-identified patent and that said Letters Patent is hereby corrected as shown below:

On the Title Page, in item (75), under "Inventors", in Column 1, Lines 2-3, delete "Farshi Ghasemzadeh," and insert -- Farshid Ghasemzadeh, --, therefor.

In the Drawings

In Fig. 3, Sheet 3 of 5, for Tag "301", in Line 1, delete "Deteremine" and insert -- Determine --, therefor.

In the Specification

In Column 7, Line 35, delete "($P_{mas\_FBS}$)" and insert -- ($P_{max\_FBS}$) --, therefor.

Signed and Sealed this
Twenty-fifth Day of August, 2015

Michelle K. Lee
*Director of the United States Patent and Trademark Office*